United States Patent [19]

Yee et al.

[11] 4,339,951
[45] Jul. 20, 1982

[54] TEMPEATURE MEASUREMENT AND DISPLAY OF INDICIA USING THERMOCHROMIC POLYACETYLENES

[75] Inventors: Kwok C. Yee, Randolph; Anthony F. Preziosi, Ledgewood; Gordhanbhai N. Patel; Ronald R. Chance, both of Morris Plains; Granville G. Miller, Morristown; Ray H. Baughman, Morris Plains, all of N.J.

[73] Assignee: Allied Corporation, Morris Township, Morris County, N.J.

[21] Appl. No.: 34,112

[22] Filed: Apr. 30, 1979

Related U.S. Application Data

[62] Division of Ser. No. 839,678, Oct. 5, 1977, Pat. No. 4,215,208.

[51] Int. Cl.$^3$ ............................................. C01K 11/12
[52] U.S. Cl. ............................ 374/162; 204/159.22; 252/408; 116/202; 116/207; 526/285
[58] Field of Search ........................ 252/408; 73/356; 116/202, 207, 216; 23/253 TP; 526/285; 204/159.19, 159.22; 430/269, 945; 260/77.5 BB, 77.5 CR, 77.5 R

[56] References Cited

U.S. PATENT DOCUMENTS

| | | | |
|---|---|---|---|
| 3,501,297 | 3/1970 | Cremeans | 96/48 |
| 3,723,121 | 3/1973 | Hauser | 96/27 |
| 3,822,134 | 7/1974 | Rasch et al. | 428/332 |
| 3,999,946 | 12/1976 | Patel et al. | 23/253 TP |

Primary Examiner—J. L. Barr
Attorney, Agent, or Firm—Alan M. Doernberg; Gerhard H. Fuchs

[57] ABSTRACT

Certain polyacetylenes exhibit reversible color changes at transition temperatures in the range $-180°$ to $220°$ C., wherein the thermochromic cycles can be repeated many times with no apparent degradation and little change in spectroscopic properties.

These thermochromic polyacetylenes are useful in temperature-indicator and indicia-display device applications.

A process for laser-beam recording of images is described employing a thermochromic polyacetylene, in which the hysteresis properties of the polyacetylene can be suitably altered allowing for selectively storing or erasing the formed image.

5 Claims, 1 Drawing Figure

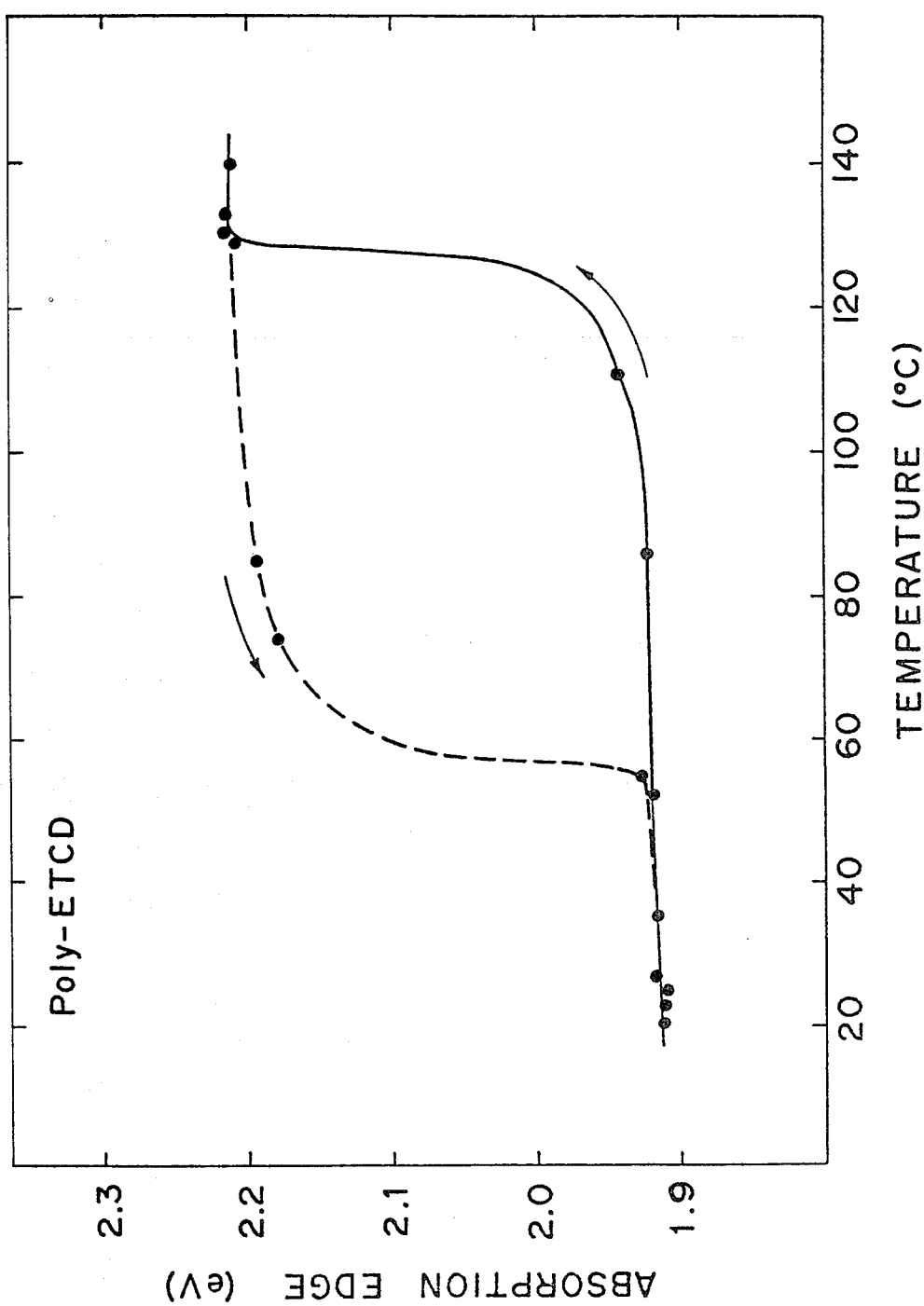

TEMPEATURE MEASUREMENT AND DISPLAY OF INDICIA USING THERMOCHROMIC POLYACETYLENES

This is a division of application Ser. No. 839,678, filed Oct. 5, 1977, now U.S. Pat. No. 4,215,208.

BACKGROUND OF THE INVENTION

1. Field of the Invention

This invention relates to thermochromic polyacetylenes useful in temperature-indicator, indicia-display and laser-writing device applications.

2. Description of the Prior Art

Examples of organic polymers which evidence thermochromic properties, that is, evidence a reversible change of color with temperature are rare in contrast to photochromic polymers. Poly[dodeca-5,7-diyn-1,12-diol bis(ethylurethane)], poly-ETCD, has been observed to change reversibly from green to red in the temperature range of 120° to 140° C., as disclosed in U.S.N.T.I.S., AD Rep. 1974, No. 783709/9GA, from Govt. Rep. Announce. (U.S.) 1974, 74 (21), 51 and G. J. Exarhos, W. M. Risen, Jr., and R. H. Baughman, Journal of American Chemical Society, Vol. 98, pp. 481–487, (1976).

U.S. Pat. No. 3,501,297 (Creamens, 1970) describes a mixture of 7,9-hexadecadiyndioic acid and monomethyl ester of 7,9-hexadecadiyndioic acid forming a blue colored image upon electron beam irradiation wherein the blue color can be reversibly converted to a red color by heating above 50° C. and returned to the blue color upon cooling to below 50° C.

Certain diacetylenes capable of forming images on exposure to radiation are described in U.S. Pat. No. 3,822,134 (1974). Mention is made of stabilizing and fixing the resulting image by heating the irradiated diacetylene to a temperature below the melting point wherein the irradiated image permanently changes color.

U.S. Pat. No. 3,999,946 (1976) describes diacetylenes containing at least two conjugated C≡C groups being capable of undergoing irreversible color changes upon thermal annealing or exposure to radiation, and being utilized as integral time-temperature history indicators.

U.S. Pat. No. 3,723,121 (Hauser, 1973) describes a process for laser beam recording utilizing a chromatic polyacetylenic material containing at least two acetylenic linkages in a conjugated system, such that the material is converted by absorption of incident laser radiation to a color which transmits the incident laser beam wherein no further change takes place. However, the process does not describe the use of materials which will undergo this process in a reversible manner, thus extending the utility of such a material in the process, nor is there described any method for selectively storing or erasing the formed image on the materials, which is an important factor in the utility of such materials for laser recording applications.

U.S. application 700,626 (1976) discloses diacetylenes of the formula, $RNHOCO-(CH_2)_n-C\equiv C-C\equiv C-(CH_2)_n-OCONHR'$ where n is at least 1 and R and R' are $C_1-C_{12}$ alkyl, as being liquid phase processable crystalline diacetylene polymers. However, no mention is made of thermochromic properties of the compounds.

German Patents Nos. 1,940,690 (1971), 1,940,691 (1971) and 1,940,692 (1971) describe the use of compounds such as the phenyl, napthyl, n-butyl, cyclohexyl, p-tolyl and p-chlorophenyl urethane derivatives of 2,4-hexadiyn-1,6-diol and 3,5-octadiyn-1,8-diol in a process for forming picture-like images, process for preparation of fibrous polymers, and as hardenable materials formed by irradiation, respectively. However, no mention is made of thermochromic properties of the materials.

It has been found that certain acetylenic monomers, containing at least one $-C\equiv C-C\equiv C-$ group, form polymers upon thermal annealing or exposure to radiation which exhibit thermochromic behavior. The thermochromic behavior is unpredictable and has been found to occur in certain narrow classes of polyacetylenic compounds.

SUMMARY OF THE INVENTION

In accordance with the present invention there is provided, a thermochromic polyacetylene composition selected from the group consisting of (1) polydiacetylenes obtained by polymerizing monomers having the following formula:

(A)
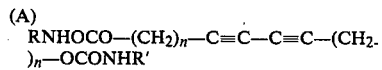
$RNHOCO-(CH_2)_n-C\equiv C-C\equiv C-(CH_2)_n-OCONHR'$ wherein
  (a) n is 4 and R and R' can be the same or different and are isopropyl, n-octadecyl, linear $C_1-C_4$ alkoxycarbonylmethyl, linear $C_1-C_4$ p- or m-alkylphenyl, o- or m-chlorophenyl or linear $C_1-C_4$ monochloroalkyl;
  (b) n is 3 and R and R' can be the same or different and are linear $C_1-C_4$ alkoxycarbonylmethyl, linear $C_1-C_4$ m-alkylphenyl, m- or p-chlorophenyl;
  (c) n is 2 and R and R' can be the same or different and are linear $C_1-C_4$ m-alkylphenyl, p-methoxyphenyl linear $C_1-C_4$ m-alkoxyphenyl;

(2) polyacetylenic network polymers obtained by 1,4-addition of crosslinkable polyacetylenes having the following formulas:

(B)
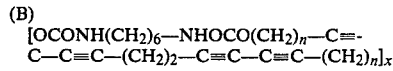
$[OCONH(CH_2)_6-NHOCO(CH_2)_n-C\equiv C-C\equiv C-(CH_2)_2-C\equiv C-C\equiv C-(CH_2)_n]_x$ wherein x is large and n is an integer from 2–6;

(C)
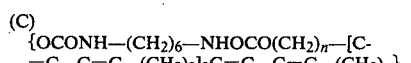
$\{OCONH-(CH_2)_6-NHOCO(CH_2)_n-[C\equiv C-C\equiv C-(CH_2)_2]_2C\equiv C-C\equiv C-(CH_2)_n\}_x$ wherein x is large and n is 3; and copolymers formed of the above formulas (B), and (C) wherein n is 3;

(3) partially polymerized acetylenic compounds containing from about 0.1 to about 50 weight percent polymer obtained by polymerizing acetylenic compositions having the following formulas:

(C)
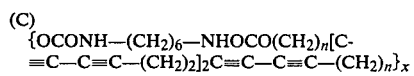
$\{OCONH-(CH_2)_6-NHOCO(CH_2)_n[C\equiv C-C\equiv C-(CH_2)_2]_2C\equiv C-C\equiv C-(CH_2)_n\}_x$ wherein x is large and n is 2 or 4;

(D)
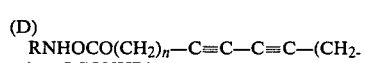
$RNHOCO(CH_2)_n-C\equiv C-C\equiv C-(CH_2)_n-OCONHR'$ wherein
  (a) n is 4 and R and R' are p-chlorophenyl;

(b) n is 3 and R and R' can be the same or different and are linear $C_4$-$C_{18}$ alkyl, linear $C_1$-$C_4$ o-alkoxyphenyl or linear $C_1$-$C_4$ o-alkylphenyl;
(c) n is 2 and R and R' can be the same or different and are linear $C_2$-$C_{18}$ alkyl, linear $C_1$-$C_4$ alkoxycarbonylmethyl or m-chlorophenyl;
(d) n is 1 and R and R' can be the same or different and are linear $C_6$-$C_{18}$ alkyl, p-chlorophenyl or o-nitrophenyl;

(E)
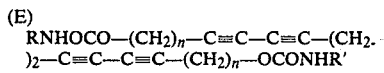
RNHOCO—$(CH_2)_n$—C≡C—C≡C—$(CH_2)_2$—C≡C—C≡C—$(CH_2)_n$—OCONHR' wherein
(a) n is 4 and R and R' can be the same or different and are linear $C_1$-$C_{18}$ alkyl;
(b) n is 3 and R and R' can be the same or different and are linear $C_1$-$C_{18}$ alkyl;
(c) n is 2 and R and R' can be the same or different and are linear $C_2$-$C_{18}$ alkyl;

(F)
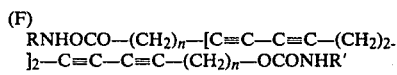
RNHOCO—$(CH_2)_n$—[C≡C—C≡C—$(CH_2)_2$]$_2$—C≡C—C≡C—$(CH_2)_n$—OCONHR' wherein
(a) n is 4 and R and R' can be the same or different and are linear $C_2$-$C_{18}$ alkyl;
(b) n is 3 and R and R' can be the same or different and are linear $C_1$-$C_{18}$ alkyl;
(c) n is 2 and R and R' can be the same or different and are linear $C_1$-$C_{18}$ alkyl or phenyl;

(G)
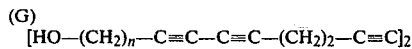
[HO—$(CH_2)_n$—C≡C—C≡C—$(CH_2)_2$—C≡C]$_2$ wherein n is 2 or 3.

A process is provided for producing thermochromic polyacetylenes which comprises the steps of (1) irradiating a monomer of formulas (A), (B), or (C) where n is 3, with at least about 0.1 Mrads of gamma radiation at room temperature or its equivalent at other temperatures and (2) extracting out unpolymerized monomer from the irradiated polyacetylene. A specific embodiment of this process is provided wherein irradiation with a dosage above 5 Mrads at room temperature, or its equivalent at other temperatures, thereby results in a lower hysteresis transition temperature.

Also provided is a process for producing thermochromic partially polymerized acetylenic compounds containing from about 0.1 to about 50 weight percent polymer which comprises irradiating a monomer of formulas (C) where n is 2 or 4, (D), (E), (F) or (G) with ultraviolet radiation or gamma radiation up to a dosage of about 5 Mrads at room temperature, or its equivalent at other temperatures.

Also provided is a device for measuring temperature comprising a substrate having deposited thereon at least one thermochromic polyacetylene, formed by polymerizing an acetylenic compound containing at least one —C≡C—C≡C— group.

There is further provided a device for displaying indicia comprising a substrate having deposited thereon at least one thermochromic polyacetylene, formed by polymerizing an acetylenic compound containing at least one —C≡C—C≡C— group, in the form of a symbol.

Further provided, is an improved process for laser beam recording of images which are storable and erasable comprising the steps of (a) generating a laser beam and (b) exposing said beam to a thermochromic layer on a substrate, thereby forming an image by the resulting heating of the thermochromic layer above its thermochromic transition temperature, the improvement which comprises forming said layer from at least one thermochromic polyacetylene, formed by polymerizing an acetylenic compound containing at least one —C≡C—C≡C— group, wherein the thermochromic polyacetylene possesses a hysteresis transition temperature which is at least about 5° C. below its thermochromic transition temperature, and maintaining said layer after exposure between the thermochromic transition temperature and hysteresis transition temperature to store the image or cooling said layer below the hysteresis transition temperature to erase the image.

BRIEF DESCRIPTION OF THE DRAWING

FIG. 1 illustrates the hysteresis curve of poly-5,7-dodecadiyn-1,12-diol bisethylurethane (poly-ETCD), polymerized by a dosage of 50 Mrads of $Co^{60}$ γ-radiation. The curve is obtained by plotting temperature vs. absorption edge in electron volts (eV), wherein the absorption edge is the energy value at which the material begins to strongly absorb incident light. An energy value of 1.9 eV indicates the material appears green gold to the eye and an energy value of 2.2 eV indicates the material appears red. The curve illustrates that poly-ETCD appears red when heated at 120°–130° C., the thermochromic transition temperature, but has to be cooled to about 51° C., the hysteresis transition temperature in order to reversibly revert to the original green-gold color.

DETAILED DESCRIPTION OF THE INVENTION

The thermochromic polyacetylenes of this invention are derived from acetylenic monomers or polymers containing at least one —C≡C—C≡C—group, and the term "thermochromic" as used herein refers to a reversible color change upon heating or cooling which is observed for the polyacetylenes of this invention.

The term polyacetylene as used herein includes polydiacetylenes, polyacetylenic network polymers, and partially polymerized acetylenic compounds.

The term polydiacetylene is used herein to describe polymers produced by 1,4-addition from monomers having formula (A).

The term polyacetylenic network polymer is used to describe the polymers produced from the crosslinkable polyacetylenes of formulas (B) and (C) wherein n is 3 by an intermolecular 1,4-addition reaction. Polymers of analogous structure have been described in U.S. Pat. No. 3,999,946, however this patent does not describe the thermochromic properties of this class of polyacetylenes.

Compositions of formulas (B) and (C) which are polymers formed from hexamethylene diisocyanate and the appropriate acetylenic diol, are referred to as crosslinkable polyacetylenes and usually have values for x of above 1. By the term "crosslinkable" is meant that the polymers contain —C≡C—C≡C— functionality, and can undergo 1,4-addition with other —C≡C—C≡C— functionalities in neighboring polymer chains.

The term partially polymerized acetylenic compounds is used to describe mixtures of monomer and polymer, containing up to about 50 weight percent polymer, obtained by polymerizing acetylenic compounds of formulas (C) where n is 2 or 4, (D), (E), (F) and (G).

The monomers for producing the polyacetylenes are generally colorless and undergo a color change upon thermal annealing or exposure to radiation. This color change is associated with an intermolecular 1,4-addition polymerization reaction between adjacent —C≡C—C≡C— functionalities. In general, the color change is a progressive process to either red or blue through gradations of shades. At higher conversions (usually above 10%) the red or blue coloration of the polyacetylene will significantly intensify resulting in a dark coloration. The polyacetylene at high conversions may also exhibit a metallic luster.

It has been unexpectedly found that certain polyacetylenes undergo a reversible color change from dark or metallic color to a bright red or orange color at a temperature below their respective melting points. For example, poly[5,7-dodecadiyn-1,12-diol bis(n-octadecylurethane)] undergoes a reversible thermochromic transition from a black-brown color at about 130° C. to a bright orange color at 140° C. and the cycle can be repeated many times with no apparent degradation of the polymer properties. This thermochromic property is associated with only a few specific types of polyacetylenes and the behavior is generally not predictable.

The observance and measurement of the thermochromic behavior is usually accomplished on any type of conventional melting point apparatus, such as a Fisher-Johns melting point apparatus, having a means for clearly viewing the color change and the thermochromic transition temperature and a means for cooling the heated polyacetylene to complete the thermochromic cycle. The thermochromism may also be monitored using absorption, normal incidence reflection, or diffuse reflectance spectroscopy.

The thermochromic polyacetylenes of this invention can be obtained by polymerization in the solid state by thermal annealing below the melting point of the monomer, or by exposure to actinic radiation. It is preferred to use actinic radiation for the polymerization process such as ultraviolet, electron-beam, alpha-, beta- or gamma-radiation, and the like, and it is particularly preferred to use gamma radiation produced from a $Co^{60}$ source, or ultraviolet radiation.

By the term "solid state" is meant a physical state which can be completely amorphous, substantially crystalline, or amorphous with crystalline regions randomly located within the solid. It is preferred to use a substantially crystalline monomer for producing the thermochromic polyacetylenes, since in general they produce substantially crystalline polyacetylenes which possess optimum thermochromic characteristics. Substantially crystalline polyacetylenes are preferred in the invention.

The thermochromic polyacetylenes of this invention produced by solid state polymerization are either fully polymerized or partially polymerized. By "fully polymerized" is meant that about 50-100% by weight of the monomer has been polymerized and most of the unreacted monomer extracted out from the crystalline polymer by a suitable solvent. In the case of the "partially polymerized" acetylenic compounds, from about 0.1-50 weight percent of the monomer has been polymerized, and the unreacted monomer is not extracted out. Thus, the term "partially polymerized" refers to a mixture of monomer and polymer, containing from about 0.1 to about 50 weight percent of polymer and preferably from about 0.5 to about 10 weight percent polymer.

The partially polymerized acetylenic compounds are unique in that generally the fully polymerized monomer does not exhibit thermochromic properties whereas the unextracted partially polymerized polyacetylene of the same monomer does. For example, partially polymerized 5,7-dodecadiyn-1,12-diol bis(p-bromophenylurethane) is thermochromic whereas the fully polymerized monomer is not. However, the reverse is true for [4,6-decadiyn-1,10-diol bis(ethoxycarbonylmethylurethane)].

The extent of polymerization is easily determined by extraction of unreacted monomer from the irradiated sample using a suitable solvent for the monomer but a nonsolvent for the polymer. The weight of the resulting polyacetylene compared to the weight of starting monomer, represents percent of the conversion.

The mechanism for thermochromism is not understood though it is believed to relate in specific fully polymerized materials to changes in crystal packing at the thermochromic transition, which affects the backbone bonding sequence and is not predictable in any straightforward way. Therefore, thermochromism is not predictable and it cannot be said that a general homologous series of compounds or general isomeric series of compounds will all exhibit the effect. For example, poly-[5,7-dodecadiyn-1,12-diol bis(n-hexylurethane)] is thermochromic, whereas poly-[5,7-dodecadiyn-1,12-diol bis(cyclohexylurethane)] is not. This unexpected thermochromic effect also extends to partially polymerized acetylenes. For example, partially polymerized 4,6-decadiyn-1,10-diol bis(o-tolylurethane) is thermochromic, but partially polymerized 4,6-decadiyn-1,12-diol bis(p-tolylurethane) is not.

To further illustrate the uniqueness and novelty of these compounds, the following is a Table listing by formulas, general classes of polyacetylenes derived by polymerizing monomers of the indicated formulas which include thermochromic and non-thermochromic members.

TABLE I

Fully Polymerized Polyacetylenes (derived from the following monomers)
(A) RNHOCO—$(CH_2)_n$—C≡C—C≡C—$(CH_2)_n$—OCONHR', where R = R'

| Thermochromic-R | n | Non-thermochromic-R |
|---|---|---|
| ethyl (prior art) | 4 | |
| iso-propyl | " | p-bromophenyl |
| n-butyl | " | o-methoxyphenyl |
| n-hexyl | " | cyclohexyl |
| n-octyl | " | cyclopropyl |
| n-dodecyl | " | t-butyl |
| n-octadecyl | " | o-tolyl |
| n-octadecyl/isopropyl | " | p-chlorophenyl |
| ethoxycarbonylmethyl | " | m-methoxyphenyl |

TABLE I-continued

| | | |
|---|---|---|
| n-butoxycarbonylmethyl | " | |
| m-tolyl | " | |
| p-tolyl | " | |
| o-chlorophenyl | " | |
| 2-chloroethyl | " | |
| ethoxycarbonylmethyl | 3 | n-hexyl |
| n-butoxycarbonylmethyl | " | n-butyl |
| m-tolyl | " | o-chlorophenyl |
| m-chlorophenyl | " | p-tolyl |
| p-chlorophenyl | " | 2,5-dimethylphenyl |
| | " | p-methoxyphenyl |
| | " | o-methoxyphenyl |
| m-tolyl | 2 | m-nitrophenyl |
| m-methoxyphenyl | " | cyclohexyl |
| p-methoxyphenyl | " | 2,6-dimethylphenyl |
| | " | o-tolyl |
| | " | p-ethoxyphenyl |
| | " | n-hexyl |
| | " | n-butyl |
| | " | 2,5-dimethylphenyl |

Partially Polymerized Acetylenic Compounds
(derived from the following monomers)
Polyacetylene Network Polymers (B) $-(OCONH-(CH_2)_6-NHOCO(CH_2)_n-C\equiv C-C\equiv C-(CH_2)_2-C\equiv C-C\equiv C-(CH_2)_n]_x-$

| Thermochromic | Non-Thermochromic |
|---|---|
| n = 2,3,4 | n = 1 |

(C)
$-\{OCONH-(CH_2)_6-(CH_2)_6-NHOCO(CH_2)_n-[C\equiv C-C\equiv C-(CH_2)_2]_2-C\equiv C-C\equiv C-(CH_2)_n\}_x$

| Thermochromic | Non-Thermochromic |
|---|---|
| n = 3 | n = 1 |

(D) $RNHOCO-(CH_2)_n-C\equiv C-C\equiv C-(CH_2)_n-OCONHR'$

| Thermochromic-R | n | Nonthermochromic-R |
|---|---|---|
| p-bromophenyl | 4 | n-hexyl |
| n-butyl | 3 | p-tolyl |
| n-hexyl | " | |
| o-methoxyphenyl | " | |
| o-tolyl | " | |
| ethyl | 2 | cyclohexyl |
| n-butyl | " | |
| n-hexyl | " | |
| n-butoxycarbonylmethyl | " | |
| m-chlorophenyl | " | |
| n-hexyl | 1 | n-butyl |
| p-chlorophenyl | " | |
| o-nitrophenyl | " | |

(E) $RNHOCO-(CH_2)_n-C\equiv C-C\equiv C-(CH_2)_2-C\equiv C-C\equiv C-(CH_2)_n-OCONHR'$
where R = R'

| Thermochromic-R | n | Non-Thermochromic-R |
|---|---|---|
| methyl | 4 | phenyl |
| ethyl | | |
| methyl | 3 | phenyl |
| ethyl | 2 | methyl |

(F) $RNHOCO-(CH_2)_n-[C\equiv C-C\equiv C-(CH_2)_2]_2 C\equiv C-C\equiv C-(CH_2)_n-OCONHR'$
where R = R'

| Thermochromic-R | n | Non-Thermochromic |
|---|---|---|
| ethyl | 4 | methyl |
| methyl | 3 | phenyl |
| ethyl | " | |

(G) $[HO(CH_2)_n-C\equiv C-C\equiv C-(CH_2)_2-C\equiv C]_2$

| Thermochromic | Non-Thermochromic |
|---|---|
| n = 2,3 | n = 1,4 |

The thermochromic polyacetylene compositions of this invention are selected from the group consisting of the solid state polymerization products of compositions of the formulas (A), (B), (C), (D), (E), (F) and (G) and specific sub-classes therein listed above in the Summary of the Invention.

The following discussion is a description of the specific sub-classes.

The designation linear $C_1$–$C_4$ alkoxycarbonylmethyl indicates linear saturated alkyl groups containing 1 to 4 carbon atoms as part of the alkoxycarbonylmethyl radical and includes n-butoxy-, n-propoxy, ethoxy- and methoxycarbonylmethyl. Likewise, linear $C_1$–$C_4$ p- or m-alkylphenyl includes n-butyl, n-propyl, ethyl and methyl radicals in the para (p-) or meta (m-) positions of the phenyl ring; linear $C_1$–$C_4$ monochloroalkyl includes monochloro derivatives of n-butyl, n-propyl, ethyl and methyl radicals including 4-, 3-, 2-, and 1-chloro-n- butyl, 3-, 2- and 1-chloro-n-propyl, 2-and 1-chloroethyl, and chloromethyl; linear $C_1$–$C_4$ m-alkoxyphenyl includes n-butoxy, n-propoxy, n-ethoxy and methoxy substituents in the m-position of the phenyl ring; linear $C_1$–$C_4$ o-alkoxyphenyl includes n-butyl, n-propoxy, ethoxy and methoxy radicals in the ortho (o-) position of the phenyl ring; linear $C_1$–$C_4$ o-alkylphenyl includes n-butyl, n-propyl, ethyl and methyl radicals in the ortho position of the phenyl ring; linear $C_1$–$C_{18}$ alkyl includes linear alkyl groups containing 1 to 18 carbon atoms from methyl to n-octadecyl; linear $C_4$–$C_{18}$ alkyl includes linear alkyl groups containing 4 to 18 carbon atoms from n-butyl to n-octadecyl; linear $C_6$–$C_{18}$ alkyl includes linear alkyl groups containing 6 to 18 carbon atoms from n-hexyl to n-octadecyl; and linear $C_2$–$C_{18}$ alkyl includes linear alkyl groups containing from 2 to 18 carbon atoms from ethyl to n-octadecyl.

Copolymers of formula (B), and (C) where n=3, are also a subject of this invention. For example, a thermochromic polyacetylene of formula (B) may contain both chain segments where n is 2 and where n is 3. Further included is a thermochromic polyacetylene copolymer containing both chain segments from formula (B) where n is 2 and formula (C) where n is 3. Thus, all possible copolymers of formula (B) and (C) where n is 3 which are thermochromic after the solid state reaction are included within the scope of this invention.

The radicals R and R' can be the same or different. When they are the same, the resulting molecule is symmetrical such as in formula (A) where n is 4 and R and R' are both isopropyl or both n-octadecyl; and when different the resulting molecule is asymmetrical such as in formula (A) where n is 4 and R is isopropyl and R' is noctadecyl, which is a specific embodiment of this invention. Thermochromic polyacetylene compositions are preferred where R is the same as R'.

Polydiacetylenes of formula (A) wherein n is 4 and R and R' are the same and are isopropyl, n-octadecyl, ethoxycarbonylmethyl, n-butoxycarbonylmethyl or m-tolyl; and wherein n is 3 and R and R' are the same and are ethoxycarbonylmethyl or n-butoxycarbonylmethyl are also specific preferred embodiments of this invention since they exhibit very sharp thermochromic color transitions.

Included among the polyacetylene compositions listed in the Summary of the Invention, are specific examples selected from the group consisting of those listed in the following Table by formula, chemical name and assigned Roman numerals. The Roman numerals are included as they are listed in the Examples in the back of the specification, for convenient reference.

TABLE II

1. Monomers Fully Polymerized Diacetylenes (derived from the following monomers)
(A) RNHOCO—$(CH_2)_n$—C≡C—C≡C—$(CH_2)_n$—OCONHR'

| n | R = R' | Chemical Name (Roman Numeral) |
|---|--------|-------------------------------|
| 4 | iso-propyl | poly-[5,7-dodecadiyn-1,12-diol bis (isopropyl urethane)] (I) |
| " | n-butyl | poly-[5,7-dodecadiyn-1,12-diol bis(n-butyl urethane)] (II) |
| " | n-hexyl | poly-[5,7-dodecadiyn-1,12-diol bis(n-hexyl urethane)] (III) |
| " | n-octyl | poly-[5,7-dodecadiyn-1,12-diol bis(n-octyl urethane)] (IV) |
| " | n-dodecyl | poly-[5,7-dodecadiyn-1,12-diol bis(n-dodecyl urethane)] (V) |
| " | n-octadecyl | poly-[5,7-dodecadiyn-1,12-diol bis(n-octadecyl urethane)] (VI) |
| " | R=n-octadecyl, R'=isopropyl | poly-[5,7-dodecadiyn-1,12-diol n-octadecyl-isopropyl urethane)] (VII) |
| " | ethoxycarbonylmethyl | poly-[5,7-dodecadiyn-1,12-diol bis(ethoxycarbonylmethyl urethane)] (VIII) |
| " | n-butoxycarbonylmethyl | poly-[5,7-dodecadiyn-1,12-diol bis(n-butoxycarbonylmethyl urethane)] (IX) |
| " | m-tolyl | poly-[5,7-dodecadiyn-1,12-diol bis(m-tolyl urethane)] (X) |
| " | p-tolyl | poly-[5,7-dodecadiyn-1,12-diol bis(p-tolyl urethane)] (XI) |
| " | o-chlorophenyl | poly-[5,7-dodecadiyn-1,12-diol bis(o-chlorophenyl urethane)] (XII) |
| " | 2-chloroethyl | poly-[5,7-dodecadiyn-1,12-diol bis (2-chloroethyl urethane)] (XIII) |
| 3 | ethoxycarbonylmethyl | poly-[4,6-decadiyn-1,10-diol bis(ethoxycarbonylmethyl urethane)] (XIV) |
| " | n-butoxycarbonylmethyl | poly-[4,6-decadiyn-1,10-diol bis(n-butoxycarbonylmethyl urethane)] (XV) |
| " | m-tolyl | poly-[4,6-decadiyn-1,10-diol bis (m-tolyl urethane)] (XVI) |
| " | m-chlorophenyl | poly-[4,6-decadiyn-1,10-diol bis (m-chlorophenyl urethane)] (XVII) |
| " | p-chlorophenyl | poly-[4,6-decadiyn-1,10-diol bis(p-chlorophenyl urethane)] (XVIII) |
| 2 | m-tolyl | poly-[3,5-octadiyn-1,8-diol bis(m-tolyl urethane)] (XIX) |
| " | m-methoxyphenyl | poly-[3,5-octadiyn-1,8-diol bis(m-methoxyphenyl urethane)] (XX) |
| " | p-methoxyphenyl | poly-[3,5-octadiyn-1,8-diol bis(p-methoxyphenyl urethane)] (XXI) |

Polyacetylene Network Polymers (derived from the following monomers)
(B) —[OCONH—$(CH_2)_6$—NHOCO$(CH_2)_n$—C≡C—C≡C—$(CH_2)_2$—C≡C—C≡C—$(CH_2)_n$]$_x$

| n | |
|---|---|
| 4 | poly-[5,7,11,13-octadecatetrayn-1,18-diol-hexamethylene diurethane] (XXII) |
| 3 | poly-[4,6,10,12-hexadecadtetrayn-1,16-diol-hexamethylene diurethane] (XXIII) |
| 2 | poly-[3,5,9,11-tetradecatetrayn-1,14,diol-hexamethylene diurethane] (XXIV) |

(C) —{OCONH—$(CH_2)_6$—NHCO—$(CH_2)_n$—[C≡C—C≡C—$(CH_2)_2$]$_2$C≡C—C≡C—$(CH_2)_n$}$_x$

| n | |
|---|---|
| 3 | poly-[4,6,10,12,16,18-docosahexayn-1,22-diol-hexamethylene diurethane] (XXVI) |

Partially Polymerized Acetylenic Compounds (derived from the following monomers)
(C) —{OCONH$(CH_2)_6$NHOCO—$(CH_2)_n$—[C≡C—C≡C—$(CH_2)_2$]$_2$—C≡C—C≡C—$(CH_2)_n$}$_x$—

| n | |
|---|---|
| 4 | poly-5,7,11,13,17,19-tetracosahexayn-1,24-diol hexamethylene diurethane] (XXV) |
| 2 | poly-3,5,9,11,15,17-eicosahexayn-1,20-diol hexamethylene diurethane] (XXVII) |

(D) RNHOCO—$(CH_2)_n$—C≡C—C≡C—$(CH_2)_n$—OCONHR'

| n | R = R' | Chemical Name (Roman Numeral) |
|---|--------|-------------------------------|
| 4 | p-bromophenyl | poly-[5,7-dodecadiyn-1,12-diol bis(p-bromophenyl urethane)] (XXVIII) |
| 3 | n-butyl | poly-[4,6-decadiyn-1,10-diol bis(n-butyl urethane)] (XXIX) |
| " | n-hexyl | poly-[4,6-decadiyn-1,10-diol bis(n-hexyl urethane)] (XXX) |

TABLE II-continued

| | | |
|---|---|---|
| " | o-methoxyphenyl | poly-[4,6-decadiyn-1,10-diol bis(o-methoxyphenyl urethane)] (XXXI) |
| " | o-tolyl | poly-[4,6-decadiyn-1,10-diol bis(o-tolyl urethane)] (XXXII) |
| 2 | ethyl | poly-[3,5-octadiyn-1,8-diol bis ethylurethane (XXXIII) |
| " | n-butyl | poly-[3,5-octadiyn-1,8-diol bis (n-butyl urethane)] (XXXIV) |
| " | n-hexyl | poly-[3,5-octadiyn-1,8-diol bis(n-hexyl urethane)] (XXXV) |
| " | n-butoxycarbonylmethyl | poly-[3,5-octadiyn-1,8-diol bis(n-butoxycarbonylmethyl urethane)] (XXXVI) |
| " | m-chlorophenyl | poly-[3,5-octadiyn-1,8-diol bis(n-chlorophenyl urethane)] (XXXVII) |
| 1 | n-hexyl | poly-[2,4-hexadiyn-1,6-diol bis(n-hexyl urethane)] (XXXVIII) |
| " | p-chlorophenyl | poly-[2,4-hexadiyn-1,6-diol bis(p-chlorophenyl urethane)] (XXXIX) |
| " | o-nitrophenyl | poly-[2,4-hexadiyn-1,6-diol bis(o-nitrophenyl urethane)] (XL) |

(E) RNHOCO—$(CH_2)_n$—C≡C—C≡C—$(CH_2)_2$C≡C—C≡C—$(CH_2)_n$—OCONHR'

| n | R = R' | Chemical Name (Roman Numeral) |
|---|---|---|
| 4 | methyl | poly-[5,7,11,13-octadecatetrayn-1,18-diol bismethylurethane] (XLI) |
| " | ethyl | poly-[5,7,11,13-octadecatetrayn-1,18-diol bisethylurethane] (XLII) |
| 3 | methyl | poly-[4,6,10,12-hexadecatetrayn-1,16-diol bismethylurethane] (XLIII) |
| 2 | ethyl | poly-[3,5,9,11-tetradecatetrayn-1,14-diol bisethylurethane] (XLIV) |

(F) RNHOCO—$[(CH_2)_n$—$[C≡C$—$C≡C$—$(CH_2)_2]_2$C≡C—C≡C—$(CH_2)_n$—OCONHR'

| n | R = R' | Chemical Name (Roman Numeral) |
|---|---|---|
| 4 | ethyl | poly-[5,7,11,13,17,19-tetracosahexayn-1,24-diol bisethylurethane] (XLV) |
| 3 | methyl | poly-[4,6,10,12,16,18-docosahexayn-1,22-diol bismethylurethane] (XLVI) |
| " | ethyl | poly-[4,6,10,12,16,1,8-docosahexayn-1,22-diol bisethylurethane] (XLVII) |
| 2 | methyl | poly-[3,5,9,11,15,17-eicosahexayn-1,20-diol bismethylurethane] (XLVIII) |
| " | ethyl | poly-[3,5,9,11,15,17-eicosahexayn-1,20-diol bisethylurethane] (XLIX) |
| " | phenyl | poly-[3,5,9,11,15,17-eicosahexayn-1,20-diol bisphenylurethane] (L) |

(G) [HO—$(CH_2)_n$—C≡C—C≡C—$(CH_2)_2$—C≡C]$_2$

| n | Chemical Name (Roman Numeral) |
|---|---|
| 3 | poly-[4,6,10,12,16,18-docosahexayn-1,22-diol] (LI) |
| 2 | poly-[3,5,9,11,15,17-eicosahexayn-1,20-diol] (LII) |

Synthesis of Thermochromic Polyacetylenes

In order to obtain the thermochromic polyacetylenes of the present invention and in particular to obtain these polymers in high yields, it is usually necessary to obtain acetylenic monomers with precursor crystal phases having suitable molecular packing in the solid state.

Monomers suitable for making the polymers of the invention can be prepared by known methods as described in U.S. Pat. No. 3,999,946, supra. For example, the mono- and bisurethane derivatives can be prepared by reacting the corresponding diyn-ol or diyn-diol with a suitable isocyanate. Thus, 5,7-dodecadiyn-1,12-diol-bis(n-octadecyl urethane) (VI) has been prepared by reacting 5,7-dodecadiyn-1,12-diol with n-octadecylisocyanate. A catalyst may be added to the reaction mixture to increase the reaction rate to produce the desired acetylenic monomer. Conventional tin catalysts (e.g., dibutyltin-di-2-ethylhexanoate, DBTE), and tertiary amines (e.g., triethylamine, TEA) have been used as catalysts. The reaction mixture may also be warmed as, for example, to about 45° to 55° C. to speed up the reaction. Such heating, however, is not required. The desired diyn-ol or diyn-diol can also be prepared by conventional methods. Thus, for example, 5,7-dodecadiyn-1,12-diol has been prepared by the oxidative coupling of the corresponding alkyne, i.e., 5-hexyn-1-ol.

Following preparation of the desired monomer, it is generally crystallized from an appropriate solvent, from the melt, or from the vapor so as to provide a solid monomer, preferably in a substantially crystalline phase, which is polymerizable. Suitable solvents employed in a solution crystallization include alkyl esters of monocarboxylic acids, alkyl alcohols, paraffins, olefins, benzenes, alkylated benzenes, ethers, ketones, petroleum ether, halogenated hydrocarbons and water. Representative examples include ethyl acetate, methyl propionate, methanol, ethanol, butanol, isopropanol, hexane, heptane, 1,4-dimethylheptane, toluene, xylene, trimethylbenzene, ethylether, isopropylether, 1,2-dimethoxyethane, tetrahydrofuran, dioxane, acetone, ethylmethyl ketone, chloroform, dichloromethane and trichloromethane and mixtures thereof. Especially preferred as crystallizing solvents are 1,2-dimethoxyethane, dioxane, tetrahydrofuran, petroleum ether, acetone, chloroform, benzene, methanol, ethanol, xylene, ethylacetate and water. Crystallization may, for example, be effected by room temperature evaporation of solutions containing from 0.0001 to 0.5 part, and preferably about 0.002 to 0.2 part by weight of mononer per part by weight of solvent or solvent blend. Alternatively, other conventional crystallization procedures may be used such as by sublimation or by cooling a saturated solution to a sufficiently low temperature (usually at or above room temperature) that the required crystallization occurred.

A process for producing the fully polymerized thermochromic polyacetylenes disclosed herein is also a subject of this invention and comprises the steps of (1) irradiating a monomer of formulas (A), (B) or (C) where n is 3 with at least about 0.1 Mrads of gamma radiation at room temperature or its equivalent at other temperatures and (2) extracting out unpolymerized monomer from the irradiated polyacetylene.

The term "0.1 Mrads of gamma radiation at room temperature or its equivalent at other temperatures" indicates that the dosage of gamma radiation required for polymerization will vary with the temperature at which the irradiation is conducted. Higher temperatures will in general require lesser amounts of gamma radiation and conversely, lower temperatures, i.e. below room temperature, will generally require slightly larger amounts of gamma radiation. It is preferred to use a dosage of gamma radiation in the range of about 15 to 100 Mrads, but higher or lower dosages can also be employed.

Extraction of the monomer from the irradiated sample can be accomplished by the use of organic solvents such as dialkyl ethers, alcohols and ketones, representative examples are diethylether, methanol, ethanol, acetone and methylethylketone wherein acetone is preferred.

A process for producing thermochromic partially polymerized acetylenic compositions containing from about 0.1 to about 50 weight percent polymer is also a subject of this invention, and comprises thermal annealing or irradiating a monomer of formula (C) where n is 2 or 4, (D), (E), (F) or (G) with ultraviolet radiation or gamma radiation up to a dosage of about 5 Mrads at room temperature or its equivalent at other temperatures.

Thus, as described above, dosages larger than 5 Mrads are generally required at radiation temperatures below room temperature, and vice versa since the required dosage of gamma radiation will vary in general with the temperature at which the radiation is conducted. This is with the proviso that no more than about 5 Mrads or its equivalent of gamma radiation is used, since higher dosages can lead to highly polymerized materials which are not thermochromic.

Ultraviolet radiation of short or long wavelength can be employed to produce the partially polymerized polyacetylenes. Radiation in the vicinity of 300 nm. is most efficient for polymerization. Usually, radiation times of 30 minutes to 16 hours are sufficient to produce the partially polymerized polyacetylenes with a conventional lamp having an intensity of about 6000 microwatts at a distance of 15" from the source, or its equivalent.

Thermal annealing can also be employed to produce the partially polymerized polyacetylenes and usually a temperature from 20° to 200° C. is used. Higher temperatures (below the melting point) of the polymerizing phase are generally preferred over lower temperatures since shorter thermal annealing times are generally required in order to obtain a desired degree of polymerization.

The infrared spectra of the polyacetylenes are essentially identical to those of the monomers, indicating that the polymers possess the same functionality as the monomer. Raman spectral evidence indicates that 1,4-addition reaction has occurred at the —C≡C—C≡C— group within the monomer molecule. The Raman intense vibration, at about 2260 cm$^{-1}$ ($\nu_{C \equiv C}$), which is characteristic of the —C≡C—C≡C— functionality of the monomer, disappears and is replaced by Raman intense vibrations between 1450 and 1540 cm$^{-1}$ and between 2060 and 2140 cm$^{-1}$ in the polymer. X-ray diffraction data indicate that the repeat dimension in the chain direction is approximately 4.9 Å (or a multiple thereof), which confirms the spectral evidence that the polymerization has proceeded by a 1,4-addition reaction.

Hysteresis Effect of Polyacetylenes

The polyacetylene compositions of this invention as listed in the Summary of the Invention, generally exhibit a hysteresis effect, e.g. after inducing the color change by heating above the thermochromic transition temperature, the material must be cooled below and, in some cases, substantially below the transition temperature, to a temperature designated the "hysteresis transition temperature", whereupon the original color reappears. Other polyacetylenes, formed by polymerizing an acetylenic compound containing at least one —C≡C—C≡C— groups, also exhibit a hysteresis effect in certain instances. For example, as shown in FIG. 1, the thermochromic transition temperature for poly-ETCD is about 130° C. This polyacetylene has to be cooled to a temperature of about 51° C., its hysteresis transition temperature, before the original color of the polyacetylene is restored. In general, the hysteresis effect requires cooling to a temperature of about 3° to 80° C. below the thermochromic transition temperature in order to restore the original color. The hysteresis temperature is found to be dependent upon the compositions of individual polymers. For example, by contrast, the hysteresis transition temperature for poly-(5,7-dodecadiyn-1,12-diol bisoctadecylurethane) is only about 3° C. below the thermochromic transition temperature.

A specific embodiment of the thermochromic polyacetylene composition, which is also a subject of this invention, is wherein the polyacetylene composition of this invention possesses a hysteresis transition temperature which is at least about 5° C. below its thermochromic transition temperature. A difference of at least 5° C. between the thermochromic transition temperature and hysteresis transition temperature is necessary for use in particular applications of temperature-indication, indicia-display devices and laser-writing devices discussed below.

It has also been found that the hysteresis transition temperature can be varied by the amount of radiation dosage used to effect polymerization. Normally, a radiation dosage of at least about 15 to 50 Mrads is required to produce a high monomer-to-polymer conversion. The higher dosages will generally produce higher monomer-to-polymer conversion. However, it has been found that larger dosages of radiation produce polyacetylenes having a lower hysteresis transition temperature, than those with a smaller dosage of radiation, even though unreacted monomer is solvent extracted in each case. This effect is not understood but probably relates to the higher crystallographic perfection of the monomer extracted polyacetylene achieved at larger dosages of radiation. Thus, for poly-ETCD the thermochromic transition temperature is about 130° C. If 100 Mrads are used to form the polymer, the hysteresis transition temperature is about 28° C. If 50 Mrads are used, the thermochromic transition temperature is little changed, but the hysteresis transition temperature is about 51° C. If 25 Mrads are used, the hysteresis transition temperature is about 69° C. Thus, higher dosages of radiation to produce the polyacetylene and higher percent conversions of monomer to polymer will generally result in a lower hysteresis transition temperature, and conversely, smaller dosages will generally result in a higher hysteresis transition temperature. This technique of varying the hysteresis transition temperature is a general one for thermochromic polyacetylenes that exhibit a hysteresis in chromatic behavior.

A specific embodiment of the process for producing thermochromic polyacetylenes, is also a subject of this invention and comprises irradiating a monomer of formulas (A), (B) or (C) where n is 3, with gamma radiation of a dosage above 0.1 Mrads at room temperature or its equivalent at other temperatures, thereby resulting in a lower hysteresis transition temperature.

Temperature-Indicator Device Utilizing Thermochromic Polyacetylenes

Thermochromic polyacetylene compositions are useful in temperature-indicator devices. This is also a subject of this invention and is a device for measuring temperature comprising a substrate having deposited thereon at least one thermochromic polyacetylene formed by polymerizing an acetylenic compound containing at least one —C≡C—C≡C— group. Further provided is a device wherein the thermochromic polyacetylene possesses a hysteresis transition temperature which is at least about 5° C. below its thermochromic transition temperature.

Included among the thermochromic polyacetylenes applicable in this device are polyacetylenes listed in the Summary of Invention and also those formed from acetylenic compounds which are diynes, triynes, tetraynes and hexaynes as described in U.S. Pat. No. 3,999,946, each containing at least one —C≡C—C≡C— group and being further substituted with substituents including urethane and alcohol radicals. Representative examples include poly-(5,7-dodecadiyn-1,12-diol bis-ethylurethane), poly-(5,7-dodecadiyn-1,12-diol bis n-butylurethane), poly-(3,5-octadiyn-1,8-diol bis-(p-methoxyphenyl)urethane and 5,7,11,13,17,19-tetracosahexayne-1,24-diol. The thermochromic polyacetylene can be applied to any suitable substrate mixed with a binder, lacquer or other suitable conventional material to adhere the crystals to the substrate. The thermochromic polyacetylene is chosen such that the polymer has a thermochromic transition temperature in the temperature region of interest, e.g. the 130°–140° C. region, where one could use poly-[5,7-dodecadiyn-1,12-diol bis n-octadecylurethane] which undergoes a color change from brown-black to orange at this temperature. Any suitable substrate may be employed in the device such as filter paper, cardboard, flexible polymers such as polyethylene, polypropylene and the like.

The hysteresis in thermochromic behavior of the polyacetylenes can be used to construct a reversible recording thermometer. Such a device would work in either of two different ways. First, if the hysteresis temperature is well below use temperature and the thermochromic transition is in the temperature range to be measured, a color change corresponding to a transition from the low temperature phase to the high temperature phase records that the device has been exposed to a temperature in excess of the thermochromic transition temperature. This response could be erased by cooling the device to below the hysteresis temperature. Second, if the thermochromic transition temperature is well above device use temperature and the hysteresis temperature is in the measurement range, a color change corresponding to a transition from the high temperature phase to the low temperature phase indicates that the device has been cooled to below the hysteresis temperature. This response could be erased by heating to above the thermochromic transition temperature.

Thus a further subject of this invention is the device for measuring temperature, further comprising a recording thermometer, wherein the thermochromic polyacetylene possesses a thermochromic transition temperature at least about 5° C. above ambient temperature, of about 20°–30° C., and a hysteresis transition temperature of at least about 5° C. below said ambient temperature.

Given the thermochromic transition temperatures of the polyacetylenes of this invention, one skilled in the art will be able to devise suitable combinations of thermochromic polyacetylene, binder, adhesive, substrates and conventional materials to utilize the device in a desired application.

Indicia-Display Device Utilizing Thermochromic Polyacetylenes

The thermochromic polyacetylenes described above are also useful in indicia-display devices. This is also a subject of this invention and is a device for displaying indicia comprising a substrate having deposited thereon at least one thermochromic polyacetylene, formed by polymerizing an acetylenic compound containing at least one —C≡C—C≡C— group, in the form of a symbol. Further provided is the device wherein the thermochromic polyacetylene possesses a hysteresis temperature which is at least about 5° C. below its thermochromic transition temperature. This device is similar in principle to the temperature-indicator device described above except that it is geared to display very specific information, e.g. indicia such as symbols comprising numerals, letters, words and the like and combinations thereof. The difference between this device and the temperature-indicator device is that instead of applying the thermochromic polyacetylene, dispersed in a suitable medium containing a binder, lacquer or other suitable conventional vehicle for adhering the material, uniformly onto a substrate, the material is painted on a surface to form the particular symbol such as a number, letter, word or the like or combinations thereof. The thermochromic polyacetylene is again chosen such that the symbol will appear at a certain predetermined temperature determined by the thermochromic transition temperature of the polyacetylene and if it is desired to temporarily store the produced colored symbol, use is made of a thermochromic polyacetylene possessing a hysteresis transition temperature at least about 5° C. below its thermochromic transition temperature. The following example illustrates this device.

Thermochromic polyacetylene (XIV) was incorporated into HALAR ® 300 (a thermoplastic polychlorotrifluoroethylene polymer made by Allied Chemical) by milling 5 weight percent of the polyacetylene into the polymer at 260° C. and then molding into a film at the same temperature. The resulting film was placed over a number, "195° C.", written on a double side sticky tape. As the resulting film was black and opaque at room temperature, the number "195° C." was invisible. The tape was then stuck on the hot plate. The hot plate was gradually heated to a temperature of 195° C. The Halar film turned orange color and the number "195° C." written on the tape became visible. Upon cooling the hot plate, the Halar film returned to black and the number "195° C." became invisible. A number of heating and cooling cycles were run, with the same results.

Other combinations of thermochromic polyacetylenes, binder, adhesive, substrate and conventional materials to use the device in a desired application will be obvious to one skilled in the art.

Process for Laser Beam Recording of Images

An improved process for laser beam recording of storable and erasable images is also a subject of this invention, which comprises the steps of (a) generating a laser beam and (b) exposing to said beam a thermochromic layer on a substrate, thereby forming an image by the resulting heating of the thermochromic layer above its thermochromic transition temperature, the improvement which comprises forming said layer from at least one thermochromic composition formed by polymerizing an acetylenic compound containing at least one —C≡C—C≡C— group, wherein the polyacetylene possesses a hysteresis transition temperature which is at least about 5° C. below its thermochromic transition temperature, and maintaining said layer after exposure between the thermochromic transition temperature and hysteresis transition temperature to store the image or cooling said layer below the hysteresis transition temperature to erase the image.

The hysteresis transition temperature of thermochromic polyacetylenes is important in processes involving laser beam recording of images, because it allows an image to be stored or erased from the recording medium after being produced, thus providing greater flexibility in the utility of the apparatus. However, the hysteresis transition temperature of the polyacetylene must be at least about 5° C. below the thermochromic transition temperature and preferably 10° C., in order to properly stabilize the image once formed and to allow various functions to be performed on the image without the danger of its being accidentally erased by inadvertent cooling through a small temperature interval. For example, poly[5,7-dodecadiyn-1,12-diol bis (n-octadecylurethane)] is not suitable since the hysteresis transition temperature is only 3° C. below the thermochromic transition temperature. Most partially polymerized diacetylenes as described in the invention exhibit very little hysteresis at all. Prior art methods for processes of laser-beam recording of images are known, such as U.S. Pat. No. 3,723,121, supra, but does not disclose methods for selectively storing and erasing the images once formed.

More than one thermochromic polyacetylene can be used in the thermochromic layer and included among the thermochromic polyacetylenes applicable in this process are polyacetylenes as discussed above formed from acetylenic compounds containing at least one —C≡C—C≡C— group and being further substituted with substituents including urethane and alcohol radicals.

In this process the laser serves as a source of localized heat for a display screen composed of a thermochromic polyacetylene. Any other source of localized heat could be substituted for the laser. An image is produced by laser writing, and with the screen temperature maintained between the thermochromic transition temperature and the hysteresis transition temperature, this image is stored indefinitely. The image can then be erased by cooling the screen below the hysteresis transition temperature—either over the entire screen or in localized areas. This cooling can be accomplished by conventional means such as thermal contact to a heat sink.

For example, a layer comprising poly-ETCD, formed by irradiating the monomer with 50 Mrads of γ radiation, is exposed to a laser beam which forms an image, wherein the image is red and the unexposed portion of the layer is brown-black. By maintaining the temperature of the exposed layer between 130° C., the thermochromic transition temperature, and 51° C., the hysteresis transition temperature, the image is stored. By lowering the temperature to below 51° C., the image is erased. If poly-ETCD made by irradiating monomer with 100 Mrads of gamma radiation is used, the temperature must be lowered to about 28° C., in order to erase the image. Thus, by selecting a thermochromic polyacetylene with a desired thermochromic transition, one skilled in the art will be able to vary the hysteresis transition temperature, utilizing different dosages of radiation to fit desired applications.

Preparation of the thermochromic polyacetylenes of the present invention and use thereof may be further illustrated by reference to the following examples which should not be construed as being limitations on the scope and spirit of the invention. Parts are by weight unless otherwise indicated.

EXAMPLE 1

Synthesis of Poly-[5,7-dodecadiyn-1,12-diol bis(n-octadecylurethane)] (VI)

A mixture of 40 parts 5,7-dodecadiyne-1,12-diol, 215 parts 1,2-dimethoxyethane, 1 part dibutyltin-di-2-ethylhexanoate and 15 parts triethylamine was prepared and the resulting mixture was stirred vigorously. A solution of 133 parts n-octadecylisocyanate in 44 parts of 1,2-dimethoxyethane was added dropwise over a period of 60 min. The reaction temperature rose to 42° C. from 18° C. within 50 min. and then subsided. After the addition, 80 parts of 1,2-dimethoxyethane was then added to the reaction mixture and the mixture was stirred for an additional 2 hrs. To this mixture was added 1390 parts of heptane. The precipitate was collected by filtration, washed with petroleum ether (bp 30°-60° C.) and dried, giving 154.6 parts (99% yield) of desired product, mp 118°-119° C. Anal: calculated $C_{50}H_{92}N_2O_4$, C, 76.47%; H, 11.81%; N, 3.57%; found: C, 75.57%; H, 11.65%; N, 3.43%. IR (KBr pellet): 3330 cm$^{-1}$ (N—H stretching), 2920+2850 cm$^{-1}$ (C—H stretching), 1680 cm$^{-1}$ (C=O), 1530 cm$^{-1}$ (N—H bending), 1470 cm$^{-1}$ (C—H), 1260 cm$^{-1}$ (C—O—C stretching). Upon exposure to light, the crystals changed to blue, indicating the compound was solid state polymerizable.

Solid State Polymerization

(A) Thermal Polymerization

About 0.39 parts of the monomer was melted and then cooled to room temperature. The resulting melt-grown monomer was then heated at 110° C. for 15 days, giving rise to a brown-red product. Removal of unreacted monomer residue by extraction with 200 parts of hot dioxane provided 0.09 parts (24% conversion) of orange-red polymer. Upon heating from room temperature to 190° C., this orange-red polymer did not show any color change. Raman: $\nu_{C\equiv C}=2111+2095$ cm$^{-1}$ and $\nu_{C=C}=1526+1483+1450$ cm$^{-1}$.

(B) Gamma-Ray Induced Polymerization (1) About 0.28 parts of the monomer (crystallized from dioxane) was irradiated with γ-rays at a dose rate of 1 Mrad/hr to a dosage of 50 Mrad. The resulting black powder was extracted with 80 parts of hot dioxane to remove unreacted monomer residue, providing 0.18 parts (63% conversion) of orange-red polymer, m.p. 163°-175° C. IR (KBr pellet): 3300 cm$^{-1}$ (N—H stretching), 2900+2850 cm$^{-1}$ (C—H stretching), 1680 cm$^{-1}$ (C=O), 1520 cm$^{-1}$ (N—H bending), 1460 cm$^{-1}$ (C—H), 1240 cm$^{-1}$ (C—O—C stretching). Raman: $\nu_{C\equiv C}=2106$ cm$^{-1}$, $\nu_{C=C}=1527+1496+1451$ cm$^{-1}$. X-ray: 11% crystalline. Upon heating from room temperature to 160° C., the orange-red polymer did not show any color change.

(2) About 0.67 parts of the monomer (crystallized from 1,2-dimethoxyethane/heptane) was melted and cooled to room temperature. The resulting melt-grown monomer was subjected to 50 Mrad of γ-radiation at a dose rate of 1 Mrad/hr. The resulting black material was extracted with 160 parts of hot dioxane to remove unreacted monomer residue, providing 0.51 parts (77% conversion) of black-brown polymer, m.p. 190°-200° C. Anal: calculated for $(C_{50}H_{92}N_2O_4)_n$: C, 76.47%; H, 11.81%; N, 3.57%; found: C, 75.20%, 75.14%; H, 11.60%, 11.80%; N, 3.50%, 3.41%. IR (KBr pellet): 3320 cm$^{-1}$ (N—H stretching), 2920+2850 cm$^{-1}$ (C—H stretching), 1650 cm$^{-1}$ (C=O), 1520 cm$^{-1}$ (N—H bending), 1460 cm$^{-1}$ (C—H bending), 1250 cm$^{-1}$ (C—O—C bending). Raman: $v_{C\equiv C}=2076$ cm$^{-1}$ and $v_{C=C}=1453$ cm$^{-1}$. X-ray: 30% crystalline.

Thermochromism

Tests for thermochromicity were carried visually on a temperature-controlled hot stage. It was noted that the black-brown polymer crystals obtained from the melt-grown monomer evidenced dramatic, reversible color change. The polymer crystals changed to bright orange from black-brown starting at about 130° C. and completed the color change at about 140° C. The original color was obtained on cooling. This thermochromic cycle could be repeated many times with no apparent degradation. In addition, this material was also investigated using diffuse reflectance spectroscopy. At the thermochromic phase transition at about 130° C., the absorption peak shifts from 615 nm to 520 nm. The hysteresis for this material was about 3° C. Further investigation showed that another phase of the same polymer also changed from black-brown to orange at 130° C., but upon further heating above 200° C., it showed a sharp change from orange to yellow. If the polymer was then cooled below 200° C., the orange color returned, but not the black-brown color. The polymer was carried through the orange-yellow transformation over many cycles with consistently vivid change in color through the transformation temperature.

This thermochromic polymer was successfully incorporated into both high density polyethylene and a thermoplastic fluorocarbon polymer, sold under the trade designation Halar 300 by Allied Chemical Corporation, without modifying the thermochromic behavior. A film of a mixture of 5% thermochromic polymer in 95% Halar 300 exhibited a dramatic reversible color change from reddish-orange to yellow over many cycles in the range 190°-200° C. However, if the film was heated overnight at 230° C., the yellow color became permanent.

EXAMPLE 2

Synthesis of Poly-[5,7-dodecadiyn-1,12-diol bis(n-dodecylurethane)] (V)

Following the procedure of Example 1, 7.0 parts of 5,7-dodecadiyn-1,12-diol and 17.4 parts ofn-dodecylisocyanate were reacted in the presence of 0.15 part dibutyltin-di-2-ethylhexanoate, 2.2 parts of triethylamine and 173 parts of 1,2-dimethoxyethane. After stirring at room temperature for 16 hrs, 410 parts of heptane was added to the reaction mixture. The precipitate was collected by filtration, washed with heptane and dried, resulting in 20 parts (90% yield) of powdery monomer, mp 115.8°-116.6° C. IR (KBr pellet): 3300 cm$^{-1}$ (N—H stretching), 2910+2840 cm$^{-1}$ (C—H stretching), 1670 cm$^{-1}$ (C=O), 1520 cm$^{-1}$ (N—H bending), 1460 cm$^{-1}$ (C—H bending), 1260+1240+1220 cm$^{-1}$ (C—O—C).

About 0.28 parts of the powdery monomer was subjected to 50 Mrad of γ-radiation at a dose rate of 1 Mrad/hr. The resulting irradiated sample (purple colored) was extracted with 200 parts of dioxane at 40° C. for 1 hr to remove any non-polymerized monomer, yielding 0.20 parts (72% conversion) of dark-purple polymer (IIA), m.p. 177°-180° C. Anal. Calc'd for $(C_{38}H_{68}N_2O_4)_x$: C, 74.01%; H, 11.11%; N, 4.54%. Found: C, 72.91%; H, 10.95%; N, 4.43%. IR (KBr pellet): 3300 cm$^{-1}$ (N—H stretching), 2900+2840 cm$^{-1}$ (C—H stretching), 1680 cm$^{-1}$ (C=O), 1520 cm$^{-1}$ (N—H bending), 1460 cm$^{-1}$ (C—H bending), 1260+1240 cm$^{-1}$ (C—O—C). Raman: $v_{C\equiv C}=2075$ cm$^{-1}$ and $v_{C=C}=1451$ cm$^{-1}$. X-ray anal: 29% crystalline. Upon heating on a temperature-controlled hot stage, the polymer crystals were observed to exhibit thermochromic behavior. At 120° C. the polymer is purple and at 160° C. it is red.

In a separate run, 0.52 parts of melt-grown monomer was exposed to 50 Mrad of γ-radiation at a dose rate of 1 Mrad/hr. The resulting irradiated sample (purple colored) was extracted with 200 parts of dioxane at 50° C. for 1 hr to remove any unpolymerized monomer, providing 0.49 parts (94% conversion) of dark purple polymer (V), m.p. 180°-190° C. IR (KBr pellet): 3300 cm$^{-1}$ (N—H stretching), 2900+2840 cm$^{-1}$ (C—H stretching), 1670 cm$^{-1}$ (C=O), 1520 cm$^{-1}$ (N—H bending), 1460 cm$^{-1}$ (C—H bending), 1250 cm$^{-1}$ (C—O—C). X-ray anal: 35% crystalline. Raman: $v_{C\equiv C}=2076+2106$ (sh) cm$^{-1}$ and $v_{C=C}=1451+1490$ (sh) cm$^{-1}$. Anal. Calc'd for $(C_{38}H_{68}N_2O_4)_x$: C, 74.01%, H, 11.11%; N, 4.54%; found: C, 73.26%; H, 11.12%; N, 4.57%. Upon heating on a temperature-controlled hot stage, the polymer crystals were observed to exhibit thermochromic phenomena between 120° C. and 160° C. similar to that observed above.

EXAMPLE 3

Synthesis of Poly-(5,7-dodecadiyn-1,12-diol n-octadecyl-isopropylurethane) (VII)

A mixture of 40 parts of methanol, 0.2 part hydroxylamine hydrochloride, 0.2 part cuprous chloride, 18.3 parts 5-hexyn-1-ol isopropylurethane, 17 parts water and 14 parts 70% ethylamine was prepared and the contents were stirred and kept under a nitrogen blanket. About 12.5 parts 6-bromo-5-hexyn-1-ol were added dropwise to the mixture over a period of about 30 minutes at a temperature range of about 35° to 40° C. An exotherm which developed during the addition was controlled with cooling. After the addition was completed, the contents were stirred at 35° to 37° C. for about 45 minutes, and 0.6 part potassium cyanide was added. The contents were mixed with 100 parts water and then extracted with ether. The ether extracts were dried and concentrated under reduced pressure yielding 23.5 parts of a viscous yellow liquid which was 5,7-dodecadiyn-1,12-diol monoisopropylurethane.

Following the general procedure of Example 1, the above-formed dodecadiyn-ol-isopropylurethane was reacted with n-octadecylisocyanate to form 5,7-dodecadiyn-1,12-diol n-octadecylisopropylurethane (VII) which had a melting point of 105°-108° C. The material was recrystallized from acetone to yield a blue powder with melting point 110°-111° C. The brown-black powder, which was obtained by irradiating the n-octadecylisopropylurethane of 5,7-dodecadiyn-1,12-diol with 50 Mrads of γ-radiation, exhibited thermochromic behavior after the as-polymerized material was extracted with acetone. The thermochromic behavior was evidenced on a Fisher-Johns melting point apparatus in which the thermochromic transition from a brown-black to a dark red was observed at 180°-205° C. This color change was reversible over many cycles observed for the polymer.

EXAMPLES 4-21

Utilizing the general procedure of Example 1, the following thermochromic polydiacetylenes were prepared, as tabulated in Table III. The appropriate diols and isocyanates used to prepare the monomer are listed. The method of crystallization of the monomer is given, either from the melt or from solution with the respective solvents used for the recrystallization designed by the abbreviation, "rex'd". The physical condition of the monomer used for polymerization is given using either monomer obtained directly from the synthesis, or melt or solution crystallized monomer. The mode of polymerization is also given being either by thermal annealing or by gamma radiation. Where gamma radiation was employed, the conditions used were a dosage of 50 Mrad delivered at a rate of 1 Mrad/hr. Unless otherwise stated, after polymerization, the product was extracted with boiling dioxane or acetone to remove unreacted monomer. Color of the polymer after extraction, percent conversion values, and melting points are also given for each thermochromic polymer in Table IV. Unless otherwise indicated, the Raman spectral bands for each polymer are in the region of about $\nu_{C\equiv C}=2060-2140$ cm$^{-1}$ and $\nu_{C=C}=1450-1540$ cm$^{-1}$ and unless otherwise indicated, the infrared spectrum of the monomer was substantially the same as for the resulting polymer.

TABLE III

| Polymer | Starting Materials | | Monomer State |
|---|---|---|---|
| | Diyndiol | Isocyanate | |
| I | 5,7-dodecadiyn-1,12-diol | isopropyl | rex'd-ethyl acetate |
| II | " | n-butyl | not rex'd |
| IIIA | " | n-hexyl | not rex'd |
| IIIB | " | " | melt-grown |
| IVA | " | n-octyl | not rex'd |
| IVB | " | " | melt-grown |
| VIII | " | ethylisocyanatoacetate | rex'd acetone/hexane |
| IX | " | n-butylisocyanatoacetate | " |
| X | " | m-tolyl | " |
| XI | " | p-tolyl | " |
| XII | " | o-chlorophenyl | " |
| XIII | " | 2-chloroethyl | " |
| XIV | 4,6-decadiyn-1,10-diol | ethylisocyanatoacetate | " |
| XV | " | n-butylisocyanatoacetate | " |
| XVI | " | m-tolyl | " |
| XVII | " | m-chlorophenyl | " |
| XVIII | " | p-chlorophenyl | " |
| XIX | 3,5-octadiyn-1,8-diol | m-tolyl | " |
| XX | " | m-methoxyphenyl | " |
| XXI | " | p-methoxyphenyl | " |

TABLE IV

| Polymer | Color | % Conversion | m.p. °C. |
|---|---|---|---|
| | | | Polymer |
| I | dark green-gold | 99 | 230-240 |
| II | " | 96 | 230-250 |
| IIIA | " | 64 | 201-203 |
| IIIB | dark green-gold | 75 | 199-201 |
| IVA | green-gold | 61 | 196-199 |
| IVB | gold | 90 | 194-199 |
| V | dark purple | 94 | 180-190 |
| VI | brown-black | 77 | 190-200 |
| VII | brown-black | 88 | 195-208 |
| | | | Monomer |
| VIII | green-gold | 95.5 (isopropylether) | 82.5-83 |
| IX | " | 92.7 (isopropylether) | 74 |
| X | metallic green-gold | 98 | 110 |
| XI | green-gold | 97 | 163 |
| XII | " | 96 | 102 |
| XIII | " | 96 | 106 |
| XIV | " | 98 (isopropylether) | 83 |
| XV | metallic green-gold | 53.8 | 67 |
| XVI | green-gold | 93 | 93 |
| XVII | dark | 100 | 95 |
| XVIII | green-gold | 98 | 150 |
| XIX | dark | 92 | 136 |
| XX | dark | 96 | 141 |
| XXI | dark | 97 | 206 |

EXAMPLE 22

Synthesis of 5,7,11 dodecatriyn-1-ol (precursor for CF$_4$ diol) and 5,7,11,13-octadecatetrayn-1,18-diol (BE$_4$ diol)

The term, BE$_4$ diol, refers to the diol used to make the urethane derivatives of formula (B) and (E) where n=4, and the term CF$_4$ diol refers to the diol used to make urethane derivatives of formulas (C) and (F), where n=4. A mixture of 60 parts methanol, 0.15 part cuprous chloride, 40 parts 70% ethylamine in aqueous solution and 1.5 parts of hydroxylamine hydrochloride was prepared. After stirring the contents a short time, 10.9 parts 1,5-hexadiyne was added in one portion. The contents were cooled to 15° C., and 25.0 parts 6-bromo-5-hexyn-1-ol in 16 parts methanol were added dropwise over a period of 20 minutes while maintaining the temperature between 15° to 25° C. After stirring for 4 hours the solvent was removed leaving a dark viscous layer. The triynol was extracted from the reaction mixture by adding 240 parts of petroleum ether (60°-110° C. boiling range) to the reaction mixture, and heating and stirring and decanting the top layer of the mixture. The extraction was repeated twice, and the petroleum ether solutions were refrigerated at −26° C. The product formed was a white viscous layer on the bottom of the petroleum ether which was isolated by decanting off the petroleum ether and which was subsequently used to form the CF$_4$ diol in Example 23.

The tetrayn-diol (BE$_4$ diol) was isolated by adding 50 parts glacial acetic acid to the remaining portion of the reaction contents, heating, and adding 150 parts of hot water while stirring, after which the contents were refrigerated at −8° C. The product BE$_4$ diol, crystallized out, was isolated by filtering and then purified by dissolving in 280 parts hot xylene and refrigerating the xylene extract at −8° C. After crystallization and filtration, the product was washed with petroleum ether and dried in a vacuum oven in the dark, to yield 7.5 parts of final product (BE$_4$ diol), light in color and fluffy in texture. The melting point of the tetrayn-diol (BE$_4$ diol) was 118.8° to 121.4° C.

EXAMPLE 23

Preparation of 5,7,11,13,17,19-tetracosahexayn-1,24-diol (CF$_4$ diol)

A mixture of 2 parts cuprous chloride, 12 parts methanol, and 4 parts N,N,N′,N′-tetramethylethylenediamine was prepared. To this mixture was added 5,7,11-dodecatriyn-1-ol, produced in Example 22, dissolved in 12 parts methanol over a period of 15 minutes while oxygen was moderately bubbled through the reaction contents. After 1 hour, oxygen flow was stopped and the methanol was distilled leaving a semi-viscous residue. To this was added 100 parts of 3 N hydrochloric acid while stirring, causing product to precipitate. It was collected by filtration, washed once with 25 parts 2 N hydrochloric acid and several times with water. The solid was dissolved in 200 parts xylene and the solution was refrigerated at −8° C. Subsequent crystallization and filtration yielded 6.0 parts of fluffy product, CF$_4$ diol, which turns blue in daylight. The melting point of the material was 101.0° to 104.1° C.

EXAMPLE 24

Synthesis of 4,6,10-undecatriyn-1-ol (precursor for CF$_3$ diol) and 4,6,10,12-hexadecatetrayn-1,16-diol (BE$_3$ diol)

The term BE$_3$ diol refers to the diol used to make urethane derivatives of formulas (B) and (E) where n=3, and the term CF$_3$ diol refers to the diol used to make urethane derivatives of formulas (C) and (F) where n=3. Following the general procedure of Example 22 but utilizing 5-bromo-4-pentyn-1-ol (instead of 6-bromo-5-hexyn-1-ol), 4,6,10,12-octadecatetrayn-1,16-diol (BE$_3$ diol) was obtained having a melting point of 126.5° to 127.8° C. Also produced from the reaction was 4,6,10-undecatriyn-1-ol, used to make CF$_3$ diol in Example 25.

EXAMPLE 25

Synthesis of 4,6,10,12,16,18-docosahexayn-1,22-diol (CF$_3$ diol)

Following the general procedure of Example 23, the triynol produced in Example 24 was converted to 4,6,10,12,16,18-1,22-diol (CF3 diol). This material is also a thermochromic polyacetylene of this invention having the Roman numeral LI, and designated as the thermochromic polymer of formula (G) where n=3.

The melting point of the desired hexayn-diol (LI) was 189.8° to 191.4° C.

EXAMPLE 26

Synthesis of 3,5,9-decatriyn-1-ol (precursor for CF$_2$ diol) and 3,5,9,11-tetradecatetrayn-1,14-diol (BE$_2$ diol)

The term BE$_2$ diol refers to the diol used to make urethane derivatives of formulas (B) and (E) where n=2, and the term CF$_2$ diol refers to the diol used to make urethane derivatives of formulas (C) and (F) where n=2. Following the procedure of Example 22 but utilizing 4-bromo-3-butyn-1-ol instead of 6-bromo-5-hexyn-1-ol, the above 3,5,9,11-tetradecatetrayn-1,14-diol (BE$_2$ diol) was prepared yielding a white polymer which turns red purple in daylight. The melting point was 151.2°–152.2° C. Also produced from the reaction was 3,5,9-decatriyn-1-ol which crystallized as white flakes m.p. 50.2°–50.6° C., which change to red slowly. This product was used to make CF$_2$ diol in Example 27.

EXAMPLE 27

Synthesis of 3,5,9,11,15,17-eicosahexayn-1,20-diol (CF$_2$ diol)

Following the general procedure of Example 23, the triyn-ol produced in Example 26 was converted to 3,5,9,11,15,17-eicosahexayn-1,20-diol (CF$_2$ diol). This material is also a thermochromic polyacetylene of this invention having the assigned Roman numeral LII and designated as the thermochromic polymer of formula (G) where n=2. No melting point of the product was obtained since it polymerized during heating and the white powdery polymer (LII) which was obtained from the reaction slowly turns blue purple in daylight.

EXAMPLE 28

Synthesis of poly-[5,7,11,13-octadecatetrayn-1,18-diol hexamethylene diurethane] (XXII)

In a reaction vessel 1.35 parts BE$_4$ diol produced from Example 22 was reacted with 0.84 parts hexamethylene diisocyanate in 70 parts tetrahydrofuran at room temperature for 2 hours in the presence of a catalytic amount of DBTE and TEA. The desired product, XXII, was collected by filtration, washed, and vacuum dried resulting in 1.9 parts of a fine fluffy off-white powder, melting point 160.6° to 165.4° C.

EXAMPLES 29–30

Following the general procedure of Example 28, XXIII was prepared from BE$_3$ diol and hexamethylene diisocyanate to yield a light tan product having a melting point of 165.8° to 168.8° C.; and XXIV was prepared from BE$_2$ diol and hexamethylene diisocyanate yielding a white fluffy material which did not melt below 300° C.

EXAMPLE 31

Synthesis of poly[5,7,11,13,17,19-tetracosahexayn-1,24-diol hexamethylene diurethane] (XXV)

In a reaction vessel 1.73 parts CF$_4$ diol produced from Example 23, was reacted with 0.84 parts hexamethylene diisocyanate in 70 parts of tetrahydrofuran at room temperature for 4 hours in the presence of a catalytic amount of DBTE and TEA. The product was precipitated with heptane and filtered. After washing several times with heptane, it was vacuum dried to yield 1.7 parts of XXV, a light tan fluffy material, melting point, 161.3° to 165.1° C.

EXAMPLES 32-33

Following the general procedure in Example 31, XXVI was prepared from $CE_3$ diol and hexamethylene diisocyanate yielding a white product which turns blue slowly, which did not melt up to 300° C.; and XXVII was prepared from $CE_2$ diol and hexamethylene diisocyanate which did not melt below 300° C.

The compositions XXII to XXVII, excluding compositions XXV and XXVII, in Examples 28-33 were irradiated with 15 Mrads of gamma radiation or long wave ultraviolet radiation for times of 30 minutes to 16 hours at a distance of 10" from the source, wherein the UV source had an intensity of about 6000 microwatts at 15", followed by extraction with acetone to yield the thermochromic polyacetylene network polymers of this invention. Compositions XXV and XXVII were irradiated with the ultraviolet source described above for shorter times producing thermochromic partially polymerized polyacetylenes. The fully polymerized materials were non-thermochromic.

EXAMPLES 34-46

The following examples illustrate partially polymerized acetylenic compounds which are formed by reacting a diyn-diol with an isocyanate as described in Examples 1 and 2, and then polymerizing the resulting monomer (crystallized from acetone/hexane) by thermal annealing at room temperature for about 2-3 months. The following partially polymerized acetylenic compounds were not extracted following thermal annealing. In general, the percent conversion of the polymers in the polymerizations is about 0.1 to about 10%. Melting points of the starting monomers are included in the examples where appropriate.

TABLE IV

| Partially Polymerized Acetylenic Compounds | Starting Materials | | m.p. °C. |
|---|---|---|---|
| | Diol | Isocyanate | |
| XXVIII | 5,7-dodecadiyn-1,12-diol | p-bromophenyl | 155 |
| XXIX | 4,6-decadiyn-1,10-diol | n-butyl | 110 |
| XXX | " | n-hexyl | 112 |
| XXXI | " | o-methoxyphenyl | 117 |
| XXXII | " | o-tolyl | 254 |
| XXXIII | 3,5-octadiyn-1,8-diol | ethyl | — |
| XXXIV | " | n-butyl | 156 |
| XXXV | " | n-hexyl | 149 |
| XXXVI | " | n-butylisocyanatoacetate | 96 |
| XXXVII | " | m-chlorophenyl | 143 |
| XXXVIII | 2,4-hexadiyn-1,6-diol | n-hexyl | 84 |
| XXXIX | " | p-chlorophenyl | 214 |
| XL | " | o-nitrophenyl | 145 |

EXAMPLE 47

Synthesis of 5,7,11,13-octadecatetrayn-1,18-diol-bismethylurethane (XLI)

Following the general procedure of Example 1, 1.3 parts $BE_4$ diol, 40 parts tetrahydrofuran, 1.14 parts of methyl isocyanate, 0.2 parts DBTE, 4 parts TEA were mixed together and allowed to react at room temperature for 1½ hours. The product was precipitated by the addition of 175 parts n-hexane and was filtered and washed several times with additional n-hexane. After drying, 1.8 parts of product, XLI, was obtained, giving a conversion of 93.8% of light tan fluffy material. The product was dissolved in 40 parts hot acetone followed by 40 parts hot petroleum ether and refrigerated at −8° C. to crystallize. The isolated product was a light tan fluffy powder having a melting point 165.4° to 166.6° C.

EXAMPLES 48 to 50

Following the above general procedure of Example 47, the following urethanes were prepared utilizing the designated diol and isocyanate starting materials.

TABLE V

| No. | Diol | Isocyanate | Melting Point (°C.) |
|---|---|---|---|
| XLII | $BE_4$ | Ethyl | 152.2 to 153.9 |
| XLIII | $BE_3$ | Methyl | 173.0 to 174.1 |
| XLIV | $BE_2$ | Ethyl | 208.0 to 209.1 |

EXAMPLE 51

Synthesis of 5,7,11,13,17,19-tetracosahexayn-1,24-diol bisethylurethane (XLV)

Following the general procedure of Example 1, 1.3 parts $CF_4$ diol, 40 parts tetrahydrofuran, 1.42 parts ethyl isocyanate, 0.2 parts DBTE, and 4 parts TEA were mixed together and allowed to react at room temperature for 1½ hours. The product was precipitated by the addition of 175 parts n-hexane and was quickly filtered and washed several times with additional n-hexane. After drying, the 2.3 parts of product XLV was obtained representing a 35.8% conversion. The product had a fluffy texture which changes blue very rapidly when exposed to daylight. The product was recrystallized by dissolving in 40 parts hot acetone followed by 20 parts hot petroleum ether. The precipitate turned blue during crystallization at about −8° C. The melting point of the material was 146.4° to 148.8° C.

EXAMPLES 52 to 56

Following the general procedure of Example 51, the following urethanes were prepared in like manner.

TABLE VI

| Compound | Diol | Isocyanate | Melting Point (°C.) |
|---|---|---|---|
| XLVI | $CF_3$ | Methyl | 202.6 to 204.2 |
| XLVII | " | Ethyl | 196.9 to 200.1 |
| XLVIII | $CF_2$ | Methyl | Does not melt |
| XLIX | " | Ethyl | " |
| L | " | Phenyl | No melting point |

EXAMPLE 57

The following Table lists the thermochromic polyacetylenes of this invention, by Roman numeral as listed in Table II, illustrating the individual transition temperature and the reversible color change occurring at that temperature. In general, the thermochromic transition can be repeated many times with no apparent degradation of the crystals. Tests were carried out visually on a Fisher-Johns melting point apparatus.

TABLE VII

| Thermochromic Polyacetylene According to Roman Numeral in Table II | Temp. of Transition | Color Change |
|---|---|---|
| I | 150°-160° C. | gold to red |

TABLE VII-continued

| Thermochromic Polyacetylene According to Roman Numeral in Table II | Temp. of Transition | Color Change |
| --- | --- | --- |
| II | 125°–135° C. | gold to red |
| III | 195° C. | gold to red |
| IVA | 190°–195° C. | dark gold to red |
| IVB | 120°–170° C. | gold to red |
| V | 120°–160° C. | purple to red |
| VI | 130°–140° C. | black brown to bright orange |
| VII | 180°–185° C. | black brown to red |
| VIII | 135° C. | green gold to red |
| IXA | 110° C. | green gold to red |
| IXB | 137° C. | red to yellow |
| X | 175°–180° C. | green gold to red |
| XI | 180°–200° C. | green gold to red |
| XII | 165°–175° C. | green gold to red |
| XIII | 137°–150° C. | green gold to red |
| XIV | 195° C. | green gold to orange |
| XV | 185° C. | green gold to red orange |
| XVI | 175°–180° C. | green gold to red |
| XVII | 170°–180° C. | dark gold to red |
| XVIII | 207°–227° C. | green gold to red brown |
| XIX | 185°–195° C. | dark gold to red |
| XX | 195°–205° C. | dark gold to red |
| XXI | 185°–195° C. | dark gold to red |
| XXII | 110°–115° C. | blue purple to brown red |
| XXIII | 95°–100° C. | red brown to orange brown |
| XXIV | 130°–135° C. | " |
| XXV | 95°–100° C. | blue to red |
| XXVI | 100°–105° C. | blue purple to red purple |
| XXVII | 55°–60° C. | blue red to orange red |
| XLI | 95°–100° C. | blue to red purple |
| XLII | 65°–70° C. | blue purple to red purple |
| XLIII | 100°–105° C. | blue to red purple |
| XLIV | 60°–65° C. | blue purple to red purple |
| XLV | 85°–90° C. | blue to red purple |
| XLVI | 85°–90° C. | blue purple to red purple |
| XLVII | 65°–70° C. | " |
| XLVIII | 75°–80° C. | blue to red purple |
| XLIX | 65°–70° C. | blue purple to red purple |
| L | 115°–120° C. | blue to red |
| LI | 55°–60° C. | blue to red |
| LII | 65°–70° C. | blue purple to red |

EXAMPLE 58

The partially polymerized acetylenic compounds XXVIII to XL were tested for thermochromic behavior as follows: Each partially polymerized compound was annealed in a test tube at the following temperatures: −180° C. (liquid nitrogen), −78° C. (dry ice-acetone mixture), 25° C. (room temperature). The colors of the crystals were compared with color tabs from the Munsell Book of Color (MacBeth Color and Photography Division, Kollmargen corporation, Newburgh, N.Y., 1973). The following table shows hue symbol numbers for the partially polymerized acetylenic compounds at different temperatures:

TABLE VIII

| Polymer | MUNSELL COLOR CODE | | | |
| --- | --- | --- | --- | --- |
| | 25° C. | Liquid $N_2$ | Dry Ice | 70° C. |
| XXVIII | 2.5 R 8/6 | 10 PB 4/8 | 10 PB 7/10 | 10 R 7/10 |
| XXIX | 7.5 PB 5/8 | 7.5 PB 6/10 | 2.5 P 6/6 | 7.5 PB 5/8 |
| XXX | 7.5 PB 4/10 | 7.5 PB 3/10 | 10 P 5/12 | 7.5 PB 4/10 |
| XXXI | 2.5 RP 7/10 | 7.5 PB 6/8 | 5 P 7/8 | 2.5 RP 7/10 |
| XXXII | 5 P 7/8 | 10 PB 7/8 | 10 PB 7/8 | 7.5 P 7/8 |
| XXXIII | 5 PB 6/8 | 2.5 PB 7/6 | 5 PB 6/8 | 7.5 PB 6/10 |
| XXXIV | 2.5 RP 7/10 | 5 P 6/6 | 7.5 P 7/8 | 2.5 RP 7/8 |
| XXXV | 10 PB 6/8 | 2.5 P 8/4 | 5 P 7/8 | 2.5 RP 7/8 |
| XXXVI | 7.5 R 4/12 | 7.5 R 3/6 | 7.5 R 4/6 | 7.5 R 5/12 |
| XXXVII | 7.5 RP 3/4 | 7.5 PB 2.5/4 | 5 P 3/4 | 7.5 RP 4/8 |
| XXXVIII | 7.5 RP 3/6 | 2.5 P 2.5/4 | 2.5 RP 3/4 | 7.5 RP 4/8 |
| XXXIX | 7.5 RP 4/12 | 7.5 RP 3/4 | 7.5 RP 4/10 | 10 RP 5/12 |
| XL | 5 RP 3/4 | 7.5 PB 2.5/2 | 10 PB 3/4 | 5 RP 3/6 |

EXAMPLE 59

The following thermochromic polyacetylenes were molded into films which were strong and pliable and were useful as temperature-indicator devices. The polyacetylenes are also capable of being incorporated into thermoplastic polymers, such as Halar 300 and useful as temperature-indicators.

A. Thermochromic polydiacetylene XIV was successfully incorporated into a film of Halar 300, (made by Allied Chemical Corporation), by molding at 260° C. The film containing 5% of the polydiacetylene, was black in color. It turned orange color at 196° C. upon heating and black upon cooling to room temperature.

The polydiacetylene XIV was molded at 210° C. to obtain a film about 3 mil thick. The polydiacetylene film showed a green-gold to orange color transition at 196° C. The film was reasonably strong (the strength was comparable to that of polyethylene film) and was pliable.

B. Thermochromic polydiacetylene XV was molded at 200° C. into a thin (about 3 mil) film. The film was green-gold in color at room temperature. Upon heating, the film turned red-orange at about 185° C. The film turned metallic green-gold upon cooling. The film was reasonably strong (strength comparable to that of polyethylene) and was pliable.

The polydiacetylene XV was incorporated into Halar 300, by molding at 260° C. The resulting Halar film (containing 5%of the polydiacetylene) was black in color. It turned orange at 185° C. upon heating and reverted to black upon cooling to room temperature.

C. The test for thermochromism of polydiacetylene VIII was carried out visually on a Fisher-Johns melting point apparatus. The polymer crystals turned red-orange from metallic green-gold at 135° C. The crystals turned metallic green-gold with a slight reddish tint upon cooling to room temperature.

Thermochromic polydiacetylene VIII was molded into film (about 3 mil thick) at 150° C. The film was pliable and dark red in color at room temperature. Upon heating, the film turned light pink at 135° C. Upon cooling, it turned back to dark red.

The thermochromic polydiacetylene VIII was incorporated into Halar 300, by molding at 260° C. The resulting Halar film (containing 5% of the polydiacetylene) was red in color. It turned orange at 135° C. upon heating and turned red upon cooling to room temperature.

D. The test for thermochromism of the polydiacetylene IX was also carried out visually on a Fisher-Johns melting point apparatus. The polymer crystals turned red from metallic green gold at 110° C. and turned yellow from red at about 137° C. Upon cooling to room temperature, the crystals turned dark red with some green-gold color tint.

The thermochromic polydiacetylene IX was molded into film (about 3 mil thick) at 150° C. The film was pliable and dark red in color. Upon heating, the film turned light pink at 110° C. Upon cooling, it turned dark red.

The thermochromic polydiacetylene IX was incorporated into Halar 300, to form a polymeric film by molding at 260° C. The resulting Halar film (containing 5% of the polydiacetylene) was red in color. It turned light orange at 110° C. upon heating and turned red on cooling to room temperature.

The thermochromic polydiacetylene IX was highly soluble in organic polar solvents such as acetone, tetrahydrofuran and chloroform. The polydiacetylene was dissolved in acetone (1 g in 100 ml). A very thin coating (red in color) of the polydiacetylene was obtained by dipping a glass slide in the solution or by spreading the solution on a polyethylene film and allowing the solvent evaporate. The coating turned orange at 115° C. and yellow at 135° C.

We claim:

1. A device for measuring temperature comprising a substrate having deposited thereon at least one thermochromic polyacetylene being a 1,4 addition polymer of an acetylenic compound selected from the group consisting of
    (1) polydiacetylenes which are 1,4 addition polymers of monomers having the following formula:

(A)
    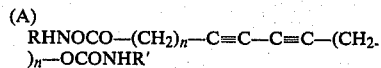
    RHNOCO—(CH$_2$)$_n$—C≡C—C≡C—(CH$_2$)$_n$—OCONHR' wherein
    (a) n is 4 and R and R' can be the same or different and are isopropyl, n-octadecyl, linear C$_1$-C$_4$ alkoxycarbonylmethyl, linear C$_1$-C$_4$ p- or m-alkylpenyl, o- or m-chlorophenyl or linear C$_1$-C$_4$ monochloroalkyl;
    (b) n is 3 and R and R' can be the same or different and are linear C$_1$-C$_4$ alkoxycarbonylmethyl, linear C$_1$-C$_4$ m-alkylphenyl, m- or p-chlorophenyl;
    (c) n is 2 and R and R' can be the same or different and are linear C$_1$-C$_4$ m-alkylphenyl, p-methoxyphenyl or linear C$_1$-C$_4$ m-alkoxyphenyl;

(2) polyacetylenic network polymers which are 1,4-addition products of crosslinking of polyacetylenes having the following formulas:

(B)
    [OCONH(CH$_2$)$_6$—NHOCO(CH$_2$)$_n$—C≡C—C≡C—(CH$_2$)$_2$—C≡C—C≡C—(CH$_2$)$_n$]$_x$ wherein x is large and n is 3; and copolymers formed of the above formulas (B), and (C) where n is an integer from 2 to 6;

(C)
    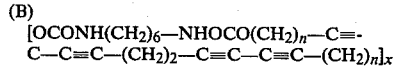
    [OCONH—(CH$_2$)$_6$—NHOCO(CH$_2$)$_n$—[C≡C—C≡C—(CH$_2$)$_2$]$_2$ C≡C—C≡C—(CH$_2$)$_n$]$_x$ wherein x is large and n is 3; and copolymers formed of the above formulas (B), and (C) where n is 3;

(3) partially polymerized acetylenic compounds containing from about 0.1 to about 50 weight percent of 1,4 addition polymers of acetylenic compositions having the following formulas:

(D)
    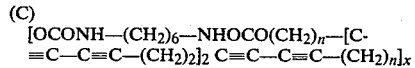
    [OCONH—(CH$_2$)$_6$—NHOCO(CH$_2$)$_n$—[C≡C—C≡C—(CH$_2$)$_2$]$_2$C≡C—C≡C—(CH$_2$)$_n$]$_x$ wherein x is large and n is 2 or 4;

(E)
    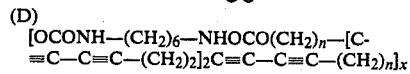
    RNHOCO(CH$_2$)$_n$—C≡C—C≡C—(CH$_2$)$_n$—OCONHR' wherein
    (a) n is 4 and R and R' are p-chlorophenyl,
    (b) n is 3 and R and R' can be the same or different and are linear C$_4$-C$_{18}$ alkyl, linear C$_1$-C$_4$ o-alkoxyphenyl or linear C$_1$-C$_4$ o-alkylphenyl;
    (c) n is 2 and R and R' can be the same or different and are linear C$_2$-C$_{18}$ alkyl, linear C$_1$-C$_4$ alkoxycarbonylmethyl or m-chlorophenyl;
    (d) n is 1 and R and R' can be the same or different and are linear C$_6$-C$_{18}$ alkyl, p-chlorophenyl or o-nitrophenyl;

(F)
    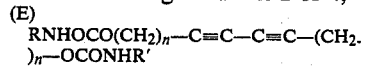
    RNHOCO—(CH$_2$)$_n$—C≡C—C≡C—(CH$_2$)$_2$—C≡C—C≡C—(CH$_2$)$_n$—OCONHR' wherein
    (a) n is 4 and R and R' can be the same or different and are linear C$_1$-C$_{18}$ alkyl;
    (b) n is 3 and R and R' can be the same or different and are linear C$_1$-C$_{18}$ alkyl;
    (c) n is 2 and R and R' can be the same or different and are linear C$_2$-C$_{18}$ alkyl;

(G)
    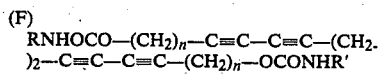
    RNHOCO—(CH$_2$)$_n$—[C≡C—C≡C—(CH$_2$)$_2$]$_2$—C≡C—C≡C—(CH$_2$)$_n$—OCONHR' wherein
    (a) n is 4 and R and R' can be the same or different and are linear C$_2$-C$_{18}$ alkyl;
    (b) n is 3 and R and R' can be the same or different and are linear C$_1$-C$_{18}$ alkyl;
    (c) n is 2 and R and R' can be the same or different and are linear C$_1$-C$_{18}$ alkyl or phenyl; and (H)
    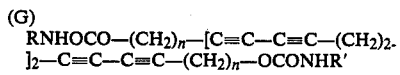
    [HO—(CH$_2$)$_n$—C≡C—C≡C—(CH$_2$)$_2$—C≡C]$_2$
    wherein n is 2 or 3.

2. The device of claim 1 wherein the thermochromic polyacetylene possesses a hysteresis transition temperature which is at least about 5° C. below its thermochromic transition temperature.

3. The device of claim 2, further comprising a recording thermometer, wherein the thermochromic polyacetylene possesses a thermochromic transition temperature of at least about 5° above ambient temperature, of about 20° to 30° C., and a hysteresis transition temperature of at least about 5° C. below said ambient temperature.

4. A device for displaying indicia comprising a substrate having deposited thereon at least one thermochromic polyacetylene, as defined in claim 1, in the form of a symbol.

5. The device of claim 4 wherein the thermochromic polyacetylene possesses a hysteresis transition temperature which is at least about 5° C. below its thermochromic transition temperature.

* * * * *